(No Model.) 4 Sheets—Sheet 1.

J. T. HAMBAY.
ART OF AND MACHINE FOR MANUFACTURING JAWS FOR COUPLING RODS.

No. 483,740. Patented Oct. 4, 1892.

WITNESSES:
Danvyn S. Wolcott
F. E. Gaither.

INVENTOR,
James T. Hambay,
by George N. Christy
Att'y.

(No Model.) 4 Sheets—Sheet 2.

J. T. HAMBAY.
ART OF AND MACHINE FOR MANUFACTURING JAWS FOR COUPLING RODS.

No. 483,740. Patented Oct. 4, 1892.

WITNESSES:
Darwin S. Wolcott
F. E. Gaither

INVENTOR.
James T. Hambay
by George H. Christy
Atty.

(No Model.) 4 Sheets—Sheet 3.

J. T. HAMBAY.
ART OF AND MACHINE FOR MANUFACTURING JAWS FOR COUPLING RODS.

No. 483,740. Patented Oct. 4, 1892.

WITNESSES:
Danvin S. Wolcott
F. E. Gaither.

INVENTOR,
James T. Hambay
by George H. Christy
Att'y.

(No Model.) 4 Sheets—Sheet 4.
J. T. HAMBAY.
ART OF AND MACHINE FOR MANUFACTURING JAWS FOR COUPLING RODS.
No. 483,740. Patented Oct. 4, 1892.
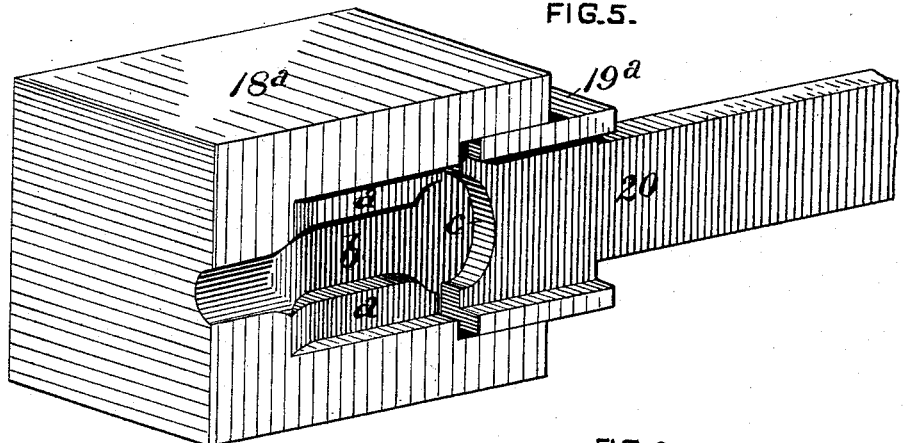
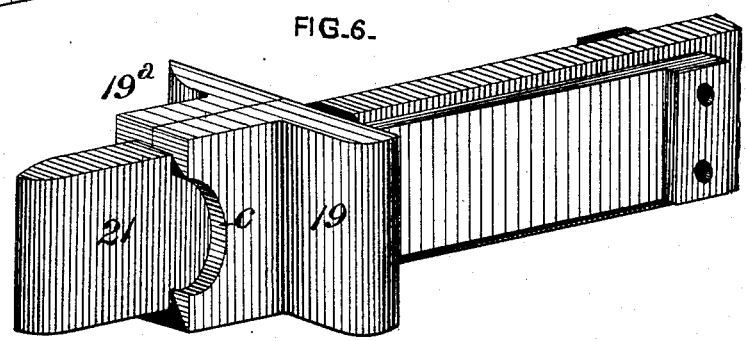
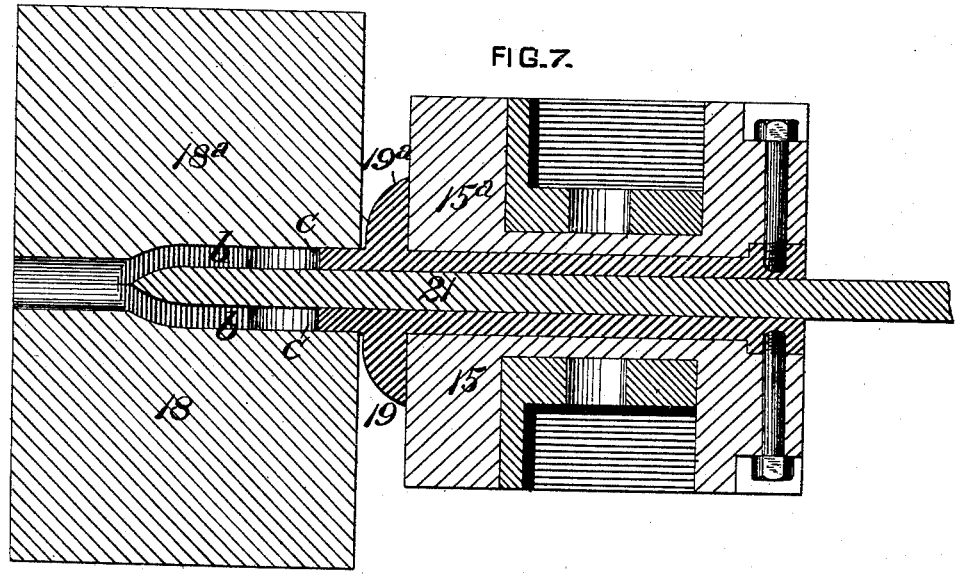
WITNESSES: INVENTOR,

UNITED STATES PATENT OFFICE.

JAMES T. HAMBAY, OF PITTSBURG, PENNSYLVANIA.

ART OF AND MACHINE FOR MANUFACTURING JAWS FOR COUPLING-RODS.

SPECIFICATION forming part of Letters Patent No. 483,740, dated October 4, 1892.

Application filed August 17, 1891. Serial No. 402,879. (No model.)

*To all whom it may concern:*

Be it known that I, JAMES T. HAMBAY, a citizen of the United States, residing at Pittsburg, in the county of Allegheny and State of Pennsylvania, have invented or discovered certain new and useful Improvements in the Art of and Machine for Manufacturing Jaws for Coupling-Rods, of which improvements the following is a specification.

The invention described herein relates to certain improvements in the manufacture of the jaws forming one member of the coupling employed for connecting the ends of rods in bridges, cars, railway-track mechanism, and in many other places. It is the usual practice in making these jaws to draw down the end of the rod so as to form one jaw, the other jaw being formed by welding a properly-shaped piece onto the bar. This method of forming the jaws is not only expensive on account of the labor involved, but considerable difficulty is experienced in making the jaws symmetrical.

The invention is hereinafter more fully described and claimed.

Figure 1:
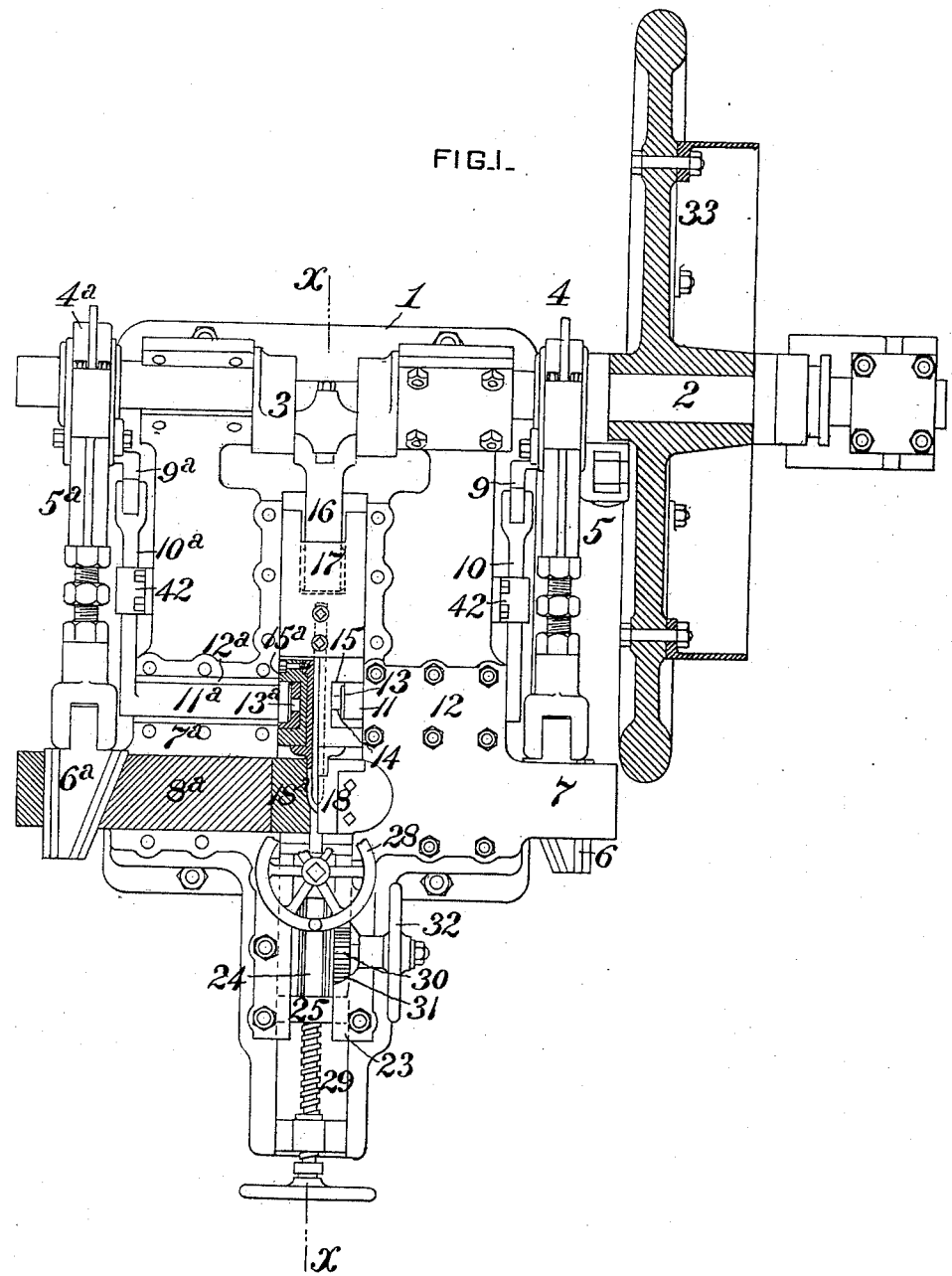
Figure 2:
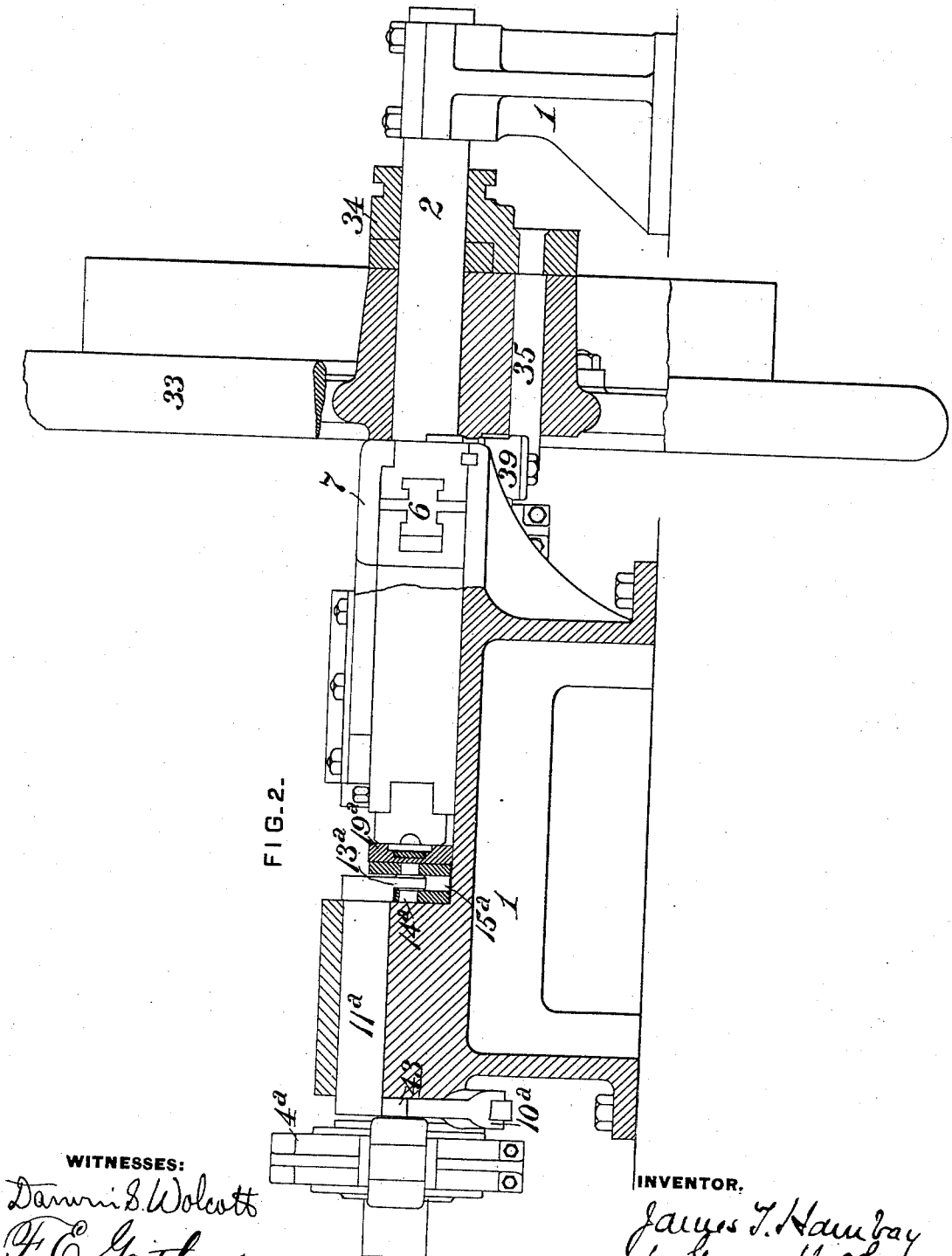
Figure 3:
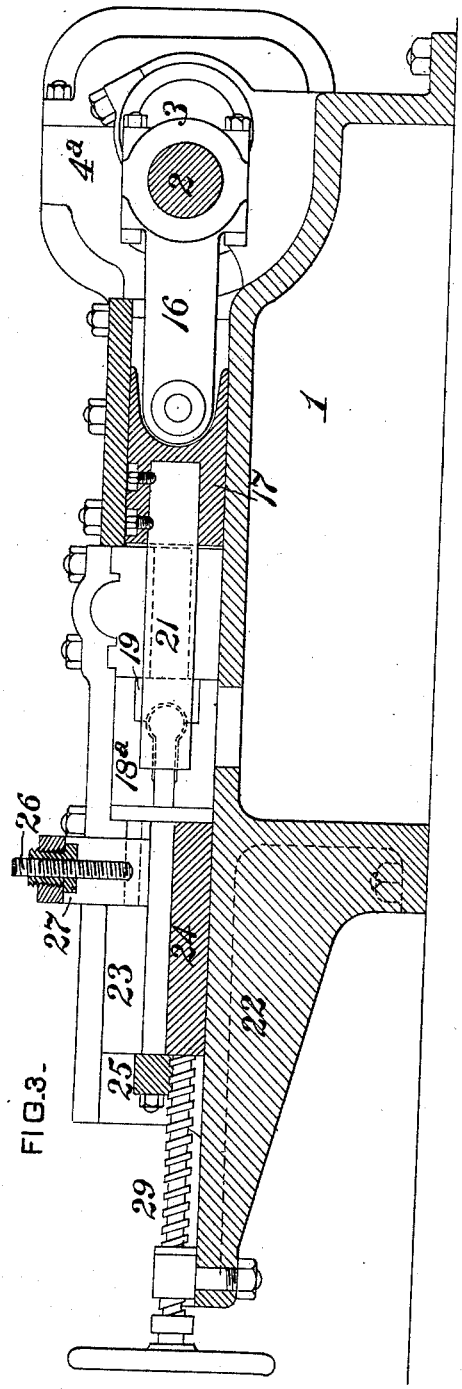
Figure 4:
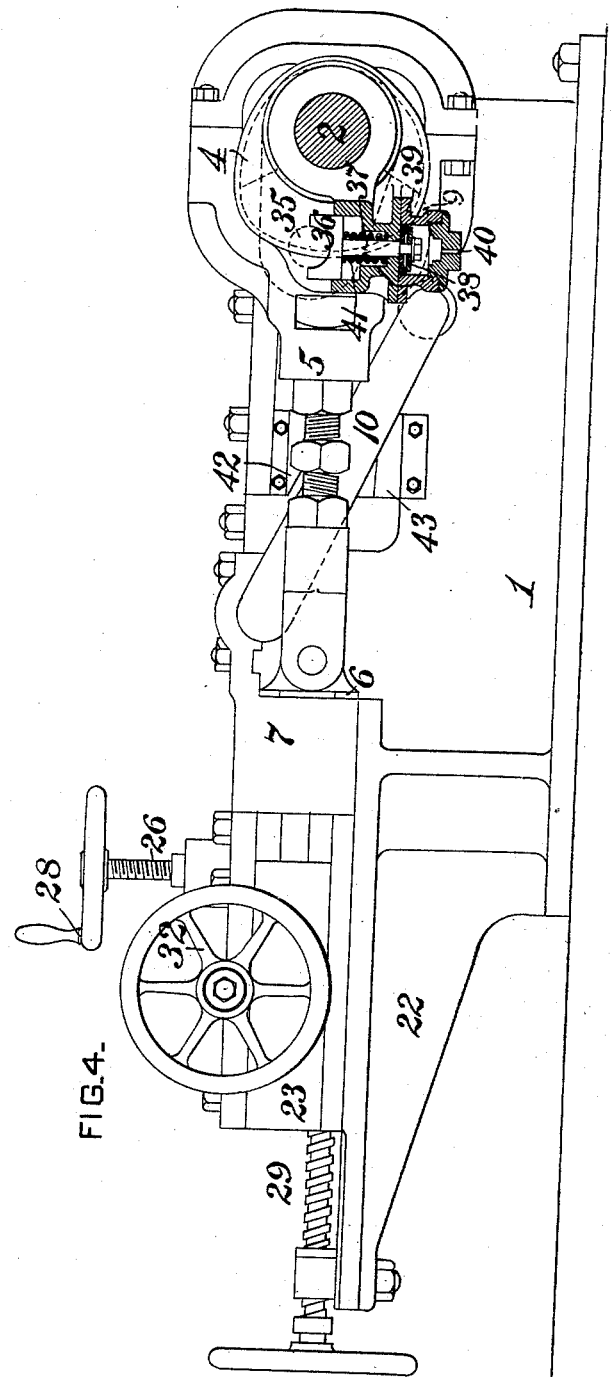

In the accompanying drawings, forming a part of this specification, Figure 1 is a view, partly in plan and partly in section, of my improved machine for manufacturing jaws. Fig. 2 is a view, partly in end elevation and partly in section, of the machine. Fig. 3 is a sectional elevation, the plane of section being indicated by the line $x\ x$, Fig. 1. Fig. 4 is a view of the machine in side elevation, the driving mechanism being shown in section. Figs. 5, 6, and 7 are detail views, on an enlarged scale, of the forming dies and knife.

On one end of the frame 1 are formed suitable bearings for the power-shaft 2, provided with a crank 3 and having the eccentrics 4 $4^a$ keyed thereon. The straps surrounding the eccentrics are provided with rods 5 $5^a$, connected to wedge-blocks 6 $6^a$, adapted to move transversely of boxes 7 $7^a$, in which are arranged blocks 8 $8^a$. The wedges are provided with grooves and projections adapted to interlock with corresponding grooves and projections in the outer ends of the boxes and the rear ends of the blocks 8 $8^a$, as shown in Figs. 1 and 2, whereby the wedges are held as against lateral movement and the blocks 8 $8^a$ are shifted positively back and forth in the boxes as the wedges are reciprocated by their eccentrics. On the inner sides of the eccentrics are bolted lugs 9 $9^a$, adapted to strike against and laterally shift the outer ends of arms 10 $10^a$ of rock-shafts 11 $11^a$, which are mounted in bearings 12 $12^a$ in the rear of the boxes 7 $7^a$, as shown in Figs. 1, 2, and 3. The rock-shafts have arms 13 $13^a$ formed on their inner ends, said arms being provided with pins 14 $14^a$, adapted to engage blocks 15 $15^a$, arranged in suitable guideways formed on the bed of the machine. The forward movements of the blocks 15 $15^a$ are effected by the lugs 9 $9^a$ striking and shifting the arms 10 $10^a$, and their backward movements are effected by the feeding in of the rod being operated on, as hereinafter described. The backward movement of the blocks 15 $15^a$ is limited by stops 42, attached to the sides of the machine and adapted to engage the arms 10 $10^a$ when raised. Similar stops 43 are preferably employed for supporting the arms 10 $10^a$ at the lower limits of their movements. The front end of the pitman 16, having its rear end connected to the crank 3, is attached to a block 17, adapted to slide back and forth as actuated by the crank in suitable guideways formed on the bed of the machine.

On the inner ends of the blocks 8 $8^a$ are attached dies 18 $18^a$, having recesses $a$ formed in their inner or adjacent faces, and in the bottoms of the recesses are formed the matrices $b$ for shaping the outer faces of the jaws, as shown in Fig. 5. The matrices $c$ for shaping the ends of the jaws are formed in the ends of the dies 19 $19^a$, adapted to move back and forth in the recesses $a$ of the dies 18 $18^a$. The matrices $c$ form a continuation of the matrices $b$ when the dies 19 $19^a$ are in their forward position, said dies being attached to the blocks 15 $15^a$, as shown in Fig. 1. The dies 19 $19^a$ have recesses 20 formed on the inner faces for the reception of the knife 21, which is attached to the sliding block 17, as shown in Figs 1 and 3.

On the front end of the machine is a bracket 22, having a guide-box 23 formed thereon, and in said box is placed the sliding feed-bed 24. The rod to be operated on is placed on the feed-bed, with its rear end against an abutment 25, and is held in position by a screw 26, passing through a yoke 27, secured to the feed-bed, said screw being provided with an operating-handle 28. The bed 24 may be shifted along the bracket by a screw 29 or by means of a pinion 30, engaging a rack-bar 31, formed on the bed, the pinion being rotated by a hand-wheel 32, as shown in Figs. 1 and 4.

The combined belt and fly-wheel 33 is loosely mounted on the shaft 2, but is locked to the shaft when desired by a clutch mechanism—such, for instance, as is shown in Figs. 2 and 4. One member of this clutch mechanism consists of a sleeve 34, adapted to slide along the shaft 2, and a pin 35, having one end attached to the sleeve and passing through an opening through the hub of the fly-wheel, as shown in Fig. 2. When the sleeve and pin are properly adjusted, the inner end of the latter as it is carried around by the fly-wheel will strike against a head or block 36 on the outer end of the rod 37 of the piston 38, arranged in the cylinder 39. This cylinder, which is bolted to the eccentric 4, is provided at one end with a small port 40 for the escape of air, as the piston is shifted along the cylinder by the impact of the pin 35 against the head 36. When the sleeve 34 is shifted, so as to move the pin out of engagement with the head 36, the piston is shifted to the end of the cylinder opposite that containing the escape-port 40 by a spring 41. arranged between the head 36 and the end of the cylinder. The interposition of an air-cushion by the construction described prevents violent shocks and jars to the machine when the fly-wheel is locked to the driving-shaft.

In forming jaws in my machine the rod is properly heated and clamped onto the feed-bed 24, which is then moved along until the heated end of the rod has been inserted a proper distance between the dies 18 18$^a$, which are drawn back, as is also the knife 21. Then by operation of the clutch mechanism the shaft 2, with its eccentrics and crank, is rotated. The eccentrics are so set on the shaft with relation to the crank as to operate through the medium of the wedges 6 6$^a$ to close the dies 18 18$^a$ around the rod. As soon as the rod is thus firmly clamped between the dies 18 18$^a$ the knife 21 is pushed forward by the crank 3, thereby splitting the end of the rod and forcing the split ends laterally in the matrices of the dies 18 18$^a$. As the knife completes its stroke, the dies 19 19$^a$ are moved forward to upset the split ends of the rod by the lugs 9 9$^a$, shifting the arms 10 10$^a$, as described. The eccentrics 4 4$^a$ are so constructed as to hold the dies 18 18$^a$ in their closed position around the rod during the operation of the knife 21 and dies 19 19$^a$. As soon as the dies 19 19$^a$ have completed their forward movement the dies 18 18$^a$ and the knife are moved back simultaneously and the rod is forced forward again into the dies, thereby pushing the dies 19 19$^a$ back, when the clamping, splitting, and swaging operations are repeated. These operations are repeated as often as is necessary to complete the jaws. If necessary, the rod is removed and reheated between the operations. As the dies open to permit of the feeding in of the rod, the operator can inspect the work done and determine the distance which it is expedient to move the rod in and also the necessity of reheating the rod before continuing the operations. As a general rule, the rod is moved in forcing the dies 19 19$^a$ back until the arms 10 10$^a$, operating said dies, abut against the stops. As but comparatively little work is done at each operation, the metal is not injuriously treated or strained, and as the work is under constant inspection the characteristic step-by-step splitting and shaping operations can be continued and regulated until the jaws are completed.

I claim herein as my invention—

1. As an improvement in the art of manufacturing jaws for coupling-rods, the method herein described, consisting in splitting the end of the rod and then simultaneously upsetting and shaping the divided portions, again splitting, upsetting, and shaping the divided ends, and continuing the splitting, upsetting, and shaping operations until the jaws are completed, substantially as set forth.

2. In a machine for manufacturing jaws for coupling-rods, the combination of dies provided with suitable matrices and a knife operating between said dies, whereby a rod held between the dies is split and the divided ends pressed laterally into the matrices of the dies, substantially as set forth.

3. In a machine for manufacturing jaws for coupling-rods, the combination of dies provided with suitable matrices and adapted to grasp the rod to be operated on, a knife operating between said dies to split the end of the rod and press the divided ends into the matrices of said dies, and dies operating alongside of the knife to upset the ends of the divided portions of the rod, substantially as set forth.

In testimony whereof I have hereunto set my hand.

JAMES T. HAMBAY.

Witnesses:
DARWIN S. WOLCOTT,
W. B. CORWIN.